United States Patent
De Vries et al.

(10) Patent No.: US 10,077,907 B2
(45) Date of Patent: Sep. 18, 2018

(54) ELECTROCHEMICAL DESCALING BY PULSED SIGNAL REVERSAL

(71) Applicant: KONINKLIJKE PHILIPS N.V., Eindhoven (NL)

(72) Inventors: Johannes Hotze Bernhard De Vries, Eindhoven (NL); Ytsen Wielstra, Eindhoven (NL); Bernardo Arnoldus Mulder, Eindhoven (NL); Nienke Cornelie De Vries-Arentsen, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 13 days.

(21) Appl. No.: 14/779,621

(22) PCT Filed: Mar. 20, 2014

(86) PCT No.: PCT/IB2014/060003
§ 371 (c)(1),
(2) Date: Sep. 24, 2015

(87) PCT Pub. No.: WO2014/162231
PCT Pub. Date: Oct. 9, 2014

(65) Prior Publication Data
US 2016/0047557 A1    Feb. 18, 2016

Related U.S. Application Data

(60) Provisional application No. 61/807,361, filed on Apr. 2, 2013.

(51) Int. Cl.
*F24D 19/00* (2006.01)
*F24H 9/00* (2006.01)
*C02F 1/46* (2006.01)

(52) U.S. Cl.
CPC ........ *F24D 19/0092* (2013.01); *C02F 1/4602* (2013.01); *F24H 9/0047* (2013.01);
(Continued)

(58) Field of Classification Search
None
See application file for complete search history.

(56) References Cited

U.S. PATENT DOCUMENTS 5,304,289 A    4/1994  Hayakawa
6,365,881 B1 *  4/2002  Itzhak ............... A47J 27/21025
                                                    219/481
(Continued)

FOREIGN PATENT DOCUMENTS

EP    0493313 A1    7/1992
JP    0737098       12/1993
(Continued)

*Primary Examiner* — Joseph M Pelham

(57) ABSTRACT

A method for heating a liquid in a heater having a heating element and a counter electrode includes the acts of (i) heating the liquid in the heater by heating the heating element to a temperature in the range of 120-250° C., and (ii) applying an AC potential difference between the heating element and the counter electrode. The AC potential difference varies with an AC frequency in the range of 200-2500 Hz and has an amplitude in the range of 1-5 V, and the liquid flows in the heater between the heating element and the counter electrode.

11 Claims, 4 Drawing Sheets

(52) U.S. Cl.
CPC ............... *C02F 2201/4613* (2013.01); *C02F 2201/4614* (2013.01); *C02F 2201/46135* (2013.01); *C02F 2201/46145* (2013.01); *C02F 2201/46155* (2013.01); *C02F 2209/05* (2013.01); *C02F 2209/055* (2013.01); *C02F 2307/10* (2013.01)

(56) References Cited

U.S. PATENT DOCUMENTS

| | | | | |
|---|---|---|---|---|
| 2009/0038944 | A1* | 2/2009 | Kruger | C02F 1/4602 204/555 |
| 2011/0299840 | A1* | 12/2011 | Wielstra | C23F 13/04 392/497 |
| 2013/0089310 | A1* | 4/2013 | Wielstra | F22B 1/30 392/457 |
| 2013/0114947 | A1* | 5/2013 | Wielstra | C02F 1/4602 392/500 |
| 2013/0298776 | A1 | 11/2013 | Mulder | |
| 2014/0138247 | A1* | 5/2014 | Aanensen | C02F 1/4602 204/571 |
| 2016/0057810 | A1* | 2/2016 | De Vries et al. | C02F 1/4602 392/457 |

FOREIGN PATENT DOCUMENTS

| | | |
|---|---|---|
| JP | 1995937098 U | 7/1995 |
| JP | 2002336861 A2 | 11/2002 |
| WO | 2006067695 A2 | 6/2006 |
| WO | 2010055472 A2 | 5/2010 |
| WO | 2012011026 A2 | 1/2012 |
| WO | 2012011051 A1 | 1/2012 |
| WO | WO 2012011026 A2 * | 1/2012 ............... F22B 1/30 |

* cited by examiner

ELECTROCHEMICAL DESCALING BY PULSED SIGNAL REVERSAL

This application is the U.S. National Phase application under 35 U.S.C. § 371 of International Application No. PCT/IB2014/060003, filed on Mar. 20, 2014, which claims the benefit of U.S. Provisional Application 61/807,361 filed Apr. 2, 2013. These applications are hereby incorporated by reference herein.

FIELD OF THE INVENTION

The invention relates to a method for heating a liquid, especially water, a (water) heating arrangement for applying such method, as well as to an electronic device comprising such (water) heating arrangement.

BACKGROUND OF THE INVENTION

Water heating devices are applied in all kind of applications, such as steam irons, electric kettles, hot drink vending machines, etc. A problem with such devices is that scale may form on the heating elements that are in contact with the water.

During operation of for instance a steam generation device, water is supplied to a part of the water infrastructure where it is heated, such as in the (external) boiler of a system iron, as a consequence of which scale may be formed. If the scale is not (periodically) removed clogging up may occur, as a result of which the performance of the steam generation device may decrease and, eventually, the steam generation device may not be fit to be used anymore.

Hard water containing significant amount of $Ca^{2+}$ and $HCO_3^-$ (bicarbonate) may form scale ($CaCO_3$) upon temperature increase via the following chemical reaction:

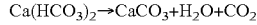

$$Ca(HCO_3)_2 \rightarrow CaCO_3 + H_2O + CO_2$$

Especially boiling water will separate scale, the scale will form in the water but also on the heating element itself as it has the highest temperature. In time scale will grow on the heating element and when internal stresses increase it will break loose from the element. Several treatments of water to prevent scaling have been claimed in the literature. A well known method is the use of ion exchangers were $Ca^{2+}$ is exchanged for $Na^+$ or $H^+$. A second well known method is the use of phosphonate that in small amount is added to the water and inhibits the formation of seeding crystals in the hard water, effectively preventing the growing of crystals and thus the formation of scale.

In the former a cartridge needs to be used with the ion exchange resin inside. After depletion the cartridge needs to be regenerated or replaced with a new one. In the latter case continuously phosphonate needs to be added as the phosphonates have limited stability at pH 7-8.5, the pH of hard water. The continuous addition can be implemented for example by using a hard-pressed tablet that very slowly liberates the phosphonates into the water. This way of working has been used in prior art steam irons. However, chemicals are added into the water which may be a drawback, for instance when water is (also) meant to be potable.

Physical methods to prevent scale formation have also been claimed but these may have a less clear working principle and the efficacy may sometimes even be doubtful in some cases. For example the use of (electro) magnets placed on water tubing for scale prevention is an example of a poorly understood and non-repeatable scale prevention method.

Also WO2012011026 and WO2012011051 describe methods to prevent scaling.

SUMMARY OF THE INVENTION

Hence, it is an aspect of the invention to provide an alternative method to prevent or reduce scaling in a water heater and/or an alternative water heater arrangement, which preferably prevents or at least partly obviates one or more of above-described drawbacks and/or relatively more complicated constructions or solutions of the prior art. It is especially an aim of the invention to prevent or reduce the formation of scale on heating elements (such as a heatable wall or an immersion heater) in heating appliances and/or to decalcify calcified surfaces of such heating elements.

Here, electrochemical scale prevention and/or removal from an (aqueous) liquid such as water is proposed. A principle could be to have two electrodes in the water connected with a DC power supply. At the anode (+electrode) oxidation is taking place. At the cathode (−electrode) reduction is taking place; in practice this means that at the cathode water is reduced:

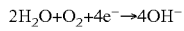

$$2H_2O + O_2 + 4e^- \rightarrow 4OH^-$$

The formation of $OH^-$ will increase pH locally and transform the $HCO_3^-$ into $CO_3^{2-}$. The $CO_3^{2-}$ will react with the $Ca^{2+}$ and calc will precipitate on the cathode.

At the anode oxidation takes place. When the anode material is oxidation resistant then water is oxidized towards oxygen and acid. The acid will dissolve calc that has been deposited on the electrode and the electrode will remain clean when used in heated (hard) water:

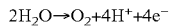

$$2H_2O \rightarrow O_2 + 4H^+ + 4e^-$$

When the anode is reactive it may be oxidized. For example metal anodes will dissolve unless very stable metal (Pt), certain transition metal oxides or carbon anodes are used. Calcified steel can be decalcified by applying a positive voltage but its effect is limited by the corrosion resistance of the metal making only small voltages/currents feasible.

In summary, such simple setup may remove scale from the water by depositing it on a cathode and keeping the (oxidation resistant) anode clean. A drawback, besides the need for corrosion resistant anode material, may be that the cathode needs to be cleaned at regular intervals.

It was found that scale (i.e. calcium carbonate ("calc") formation) can be prevented by applying an AC signal onto two electrodes of which one is a heating element.

By continuous reversal of the signal the heating element is alternating an anode or cathode. This means that alternating acid and base is generated at the surface of the heating element effectively weakening the adhesion of scale on to the heating element.

The basic idea behind the AC signal is that corrosion is suppressed by preventing metal ions to move from the electrode into solution. When the signal is positive, metal ions tend to leave the electrode into the water (corrosion). When the signal is sufficiently fast reversed the metal ions are pulled back to the electrode. When the reversal is fast enough ions cannot escape the boundary layer at the metal surface and corrosion is prevented.

Although the addition of a high frequency signal can suppress the corrosion of a single low frequency AC signal there is a drawback. The second AC signal needs to have certain amplitude to be effective. That means that when for example the amplitudes of both AC signals are equal that at the peak of the low frequency signal the amplitude is modulated by the second frequency bringing it down to 0V in the minimum but doubles it at the maximum (see below). The doubling of the amplitude can then result again in corrosion in spite of the second AC signal being present that could have prevented this corrosion due to the peak amplitude exceeding corrosion threshold.

Furthermore one should note that in this example at the peak of the low frequency signal thus where the highest risk of corrosion is, the signal is only reversed to 0V. In reality this means that tweaking the right signal for a water heating device to prevent scale formation and corrosion is rather cumbersome as not only frequencies have to be chosen right but also the amplitudes (including an optional DC). Sufficient amplitude is needed for scale prevention but at the peaks the amplitude should not cross a certain threshold where the boundary layer at the electrode is destroyed and corrosion sets in.

It was surprisingly found that under very specific conditions, with a fast AC signal with the right amplitude, the right temperature, and in a configuration wherein the liquid to be heated flows between two electrodes, it is possible to overcome the drawbacks of the prior art, and scale formation and corrosion may be prevented and/or reduced. However, as indicated above, too low or too high frequencies are also not desired.

Hence, in a first aspect the invention provides a method for heating a liquid in a heater, wherein the heater comprises a heating element and a counter electrode, wherein the method comprises (i) heating the liquid in the heater by heating the heating element to a temperature in the range of 120-250° C., and (ii) applying an AC potential difference (V) between the heating element and the counter electrode, wherein the AC potential difference varies with an AC frequency (f) in the range of 200-2500 Hz and has an amplitude, especially in the range of 1-5 V, and wherein especially the liquid flows in the heater between the heating element and the counter electrode. Therefore, the invention provides a method wherein during or after heating a liquid, the heating element is subject to a fluctuating potential difference, wherein this fluctuation has a relative high frequency, in the range of 200-2500 Hz (and while being in contact with a (hot) aqueous liquid, especially water). Especially, the AC frequency is in the range of 400-2200 Hz, such as 600-2000 Hz. Operating outside the indicated AC frequency, i.e. too low or too high frequency, such as below about 200 Hz or above about 2500 Hz, appear to provide worse results with respect to scale formation and/or oxidation. Hence, it surprisingly appears that with this solution, scaling can substantially be prevented and/or removed and corrosion can be prevented. When an alternating current (AC) is supplied to the electrodes, alternating acid and base will be formed at the electrodes. While scale is formed during heating it will substantially not adhere to the electrode walls as it is constantly dissolved and re-precipitated at the electrode surface. The method can also be used to decalcify already calcified surfaces.

The mobility of ions (in the liquid to be heated or being heated) depends on the temperature. In water heating systems operated at relative low power the mobility is relative low. When a heater is operated under pressure and at high power like for example in a (flow through) heater of e.g. an espresso coffee machine the mobility is relative high. It appears that the higher the operating temperature the more symmetric the electrical signal may be to be to prevent corrosion. An additional DC signal may be low or even zero when the heater is operated at high temperature. At high temperatures, such as equal to or over 120° C. (i.e. of the heating element that is in contact with the liquid), the signal may especially be relative symmetrical.

In general, the signal will have a duty cycle close to 100%. The term "duty cycle" is known in the art, and especially relates to the percent of time that an entity spends in an active state as a fraction of the total time under consideration. For instance, when an AC potential has a sinusoidal shape, and the signal follows this sine, the duty cycle is 100%. Would however during 25% of the time the signal be zero, or e.g. have an opposite signal (to the situation wherein the signal would follow the sine), the duty cycle would be 75%. Hence, especially the AC voltage is applied with a duty cycle of the pulse being e.g. ≥95%, such as especially 100%. Hence, especially only the AC voltage is applied, without further additions or tweaking. Hence, especially the AC voltage that is applied is based on a single component (having the indicated frequency), with a duty cycle of 100%, and with a DC component <0.2 V, especially 0 V.

It further appeared in embodiments that especially beneficial is when the AC frequency (f) is the range of 500-1500 Hz, wherein the AC voltage has a sinusoidal character, and wherein the potential difference is in the range of 1-5 V, such as at least 1.2 V, like 1.5-5 V, such as especially 1.5-4 V. Note that in the present invention optionally also the counter electrode may be configured as heating element. Hence, in an embodiment, the liquid may flow between two heating elements, which are both used as electrodes.

In yet further embodiments, the method may comprise heating the heating element to a temperature in the range of 120-250° C., like in the range of 140-200° C. Under the conditions described herein, this may imply that water may be heated to a temperature in the range of about 80-110° C., especially about 85-100° C. The heating element may especially be used to heat the liquid to a temperature close to the boiling temperature (of the liquid). Further, the liquid may be heated under elevated pressure, i.e. a pressure above 1 bar. Hence, in an embodiment the liquid in contact with the heating element is (brought) at a pressure in the range of 1-12 bar, especially 1-10 bar. In some instance, the pressure may be in the range of 7-12 bar, like 7-10 bar. To this end, the heater arrangement may further comprise a device configured to impose a pressure to the liquid, especially a pressure larger than 1 and equal to or below 12 bar, such as in the range of >1 bar and ≤10 bar, like e.g. 7-10 bar. For instance, such device may be a pump, such as known to the person skilled in the art. In specific embodiments, the (hot) liquid has a temperature in the range of 0.25-20° C. less than the boiling temperature, such as 1-15° C. less than the boiling temperature. Hence, at least part of the heating element may thus be in contact with liquid with such temperature, during at least part of the operating time. Hence, in an embodiment, the invention also involves a method wherein the liquid is heated with the heating element to a temperature in the range of 0.25-20° C. less than the boiling temperature, such as 1-15° C. less than the boiling temperature.

The liquid may flow along the heating element. Hence, in an embodiment the method may further comprise flowing the liquid along the heating element, especially with a flow speed in the range of 1.5-10 ml/s, such as in the range of 2-3.5 ml/s or 4.5-7 ml/s. In a specific embodiment, the method may thus comprise flowing the liquid between the heating element and the counter electrode with a flow speed in the range of 1.5-10 ml/s, such as in the range of 3-6 ml/s, like 4-6 ml/s. Therefore, in an embodiment the heater is configured to flow the liquid between the heating element and the counter electrode. In a further specific embodiment, the heater comprises a flow through heater, wherein the heating element encloses the counter electrode. In yet a further specific embodiment, the heating element and the counter electrode have a mutual (shortest) distance in the range of 0.5-5 mm. In alternative embodiments, the heater comprises a flow through heater, wherein the counter electrode encloses the heating element. In yet other embodiments, both the heating element and counter electrode are configured to heat the liquid (the counter electrode thus comprising a second heating element).

Especially beneficial is the use of AC signals that have a sinusoidal or triangular or block shape. Especially, sinusoidal shaped AC signals may be of interest. Hence, in a specific embodiment, the AC voltage has a sinusoidal wave shape.

Application of the AC voltage may be before, during, or after heating of the (aqueous) liquid. Preferably, the AC voltage is applied during heating of the (aqueous) liquid. The phrase "applying an AC voltage between the heating element and a counter electrode" and similar phrases relate to the embodiment(s) that the heating element and the counter electrode are both in contact with the (aqueous) liquid. Hence, the phrase "applying an AC voltage between the heating element and a counter electrode" refers to "applying an AC voltage between the heating element and a counter electrode, while the heating element and the counter electrode are in contact with the (aqueous) liquid. The phrase "in contact" include embodiments wherein at least part of the item is in contact. For instance, at least part of the heating element or at least part of the counter electrode may be in contact with the (aqueous) liquid, respectively. Especially, the heating element can be earthed (grounded).

Herein, the liquid is especially water (though other aqueous liquids may also be heated with the method and heater arrangement as described herein). The method may be used for hard and soft water, especially for water having a water conductivity of preferably at least 100 µS/cm.

The heating element can be immersed directly in the water or be arranged as (part of a) wall of the heater. In both cases the heater element (wall) acts as electrode and is electrically connected to the counter electrode. The (surface of the) heating element is thus in contact with the (aqueous) liquid in the heater. This is herein also indicated by the phrase "wherein the heating element is in contact with the (aqueous) liquid". Note that the term heating element thus refers to that part (element) that is in contact with the (aqueous) liquid and provides (when using the heater to heat the (aqueous) liquid) the heat from the heater to the (aqueous) liquid. It is on the heating element (or more especially its (part of the) surface that is in contact with the (aqueous) liquid) that scale may deposit. The term "heating element" may thus not necessarily refer to the actual heat generation device that generates the heat, but refers to that part/element, that transfers the heat to the (aqueous) liquid. In an embodiment, the term "heating element" may also refer to a plurality of heating elements.

The heating element for heating the (aqueous) liquid herein preferably comprises one or more metal parts for heating the liquid or is essentially from metal, such as a steel wall or a steel immersion heater. Hence, the heating element is herein also indicated as metal heating element. On this metal of the heating element that is in contact with the (aqueous) liquid, scale may deposit. Preferably, the heating element for heating the (aqueous) liquid herein preferably comprises one or more steel parts for heating the liquid or is essentially from steel. Hence, the heating element, or the part of the heating element in contact with the water is preferably made of steel (though other materials may also be possible). In a specific embodiment, the heating element is a steel heating element.

The term "counter electrode" may in an embodiment also refer to a plurality of counter electrodes. For instance, when more than one signal is applied, in principle different counter electrodes may be applied. In an embodiment, the applied signals are applied on separate counter electrodes wherein thus the counter electrode comprises a plurality of counter electrodes, and wherein the AC voltage is applied between the heating element and a first counter electrode, and wherein a second AC voltage is applied between the heating element and a further counter electrode. Especially when two or more AC signals are applied, it may be an option to use for each AC signal a different counter electrode.

The counter electrode may for instance be a stainless steel or a mixed metal oxide (MMO), a carbon based or a platinum electrode. Where the wall of the heater is used as counter electrode, preferably the counter electrode is of metal, more preferably of steel.

The term "steel" herein especially refers to stainless steel. Any grade of stainless steel can be applied. Preferably the steel contains both Cr and Ni (e.g. grade 304) while additional presence of small amounts of Mo is especially beneficial (e.g. grade 316 or higher).

The term "heater" is used to indicate a device that is arranged to heat a liquid, such as water. The heater especially relates to a water heater. The term "water heater" is used to indicate a device that is arranged to heat an (aqueous) liquid, such as water. The term "water heater" (herein shortly indicated with "heater") may for instance refer to a steam generation chamber (based on heating an (aqueous) liquid). The heater may be of the flow through heater type. The heater may for instance heat the (aqueous) liquid in an embodiment via a heat generation device connected to the heater wall, wherein the wall (which is in contact with the (aqueous) liquid), is the heating element (for heating the (aqueous) liquid), or may for instance in an embodiment heat via an element in the (aqueous) liquid, such as water, such as in the case of an immersion type of heater (in which the heating element is in contact with the (aqueous) liquid), etc. Different types of heating elements may be applied (at the same time). The term "(water) heater" may also refer to a (closed) boiler arranged to produce steam, to a (closed) boiler arranged to produce heated water, to a flow through heater or to a steamer. In a specific embodiment, the heater arranged for heating an (aqueous) liquid is selected from the group consisting of a flow through heater (see also below), a flow through steamer, a heater for heating water and a heater for producing steam. Further, the heater may also be configured to provide heated water and steam. Included are also heater blocks where the heating element and e.g. the tube that carries the water are embedded in a block of aluminum.

Heating may be any heating at temperatures above room temperature, but especially refers to heating (of the (aqueous) liquid) above 50° C., such as especially heating the (aqueous) liquid in the heater to a temperature of at least 85° C. The term heating may thus include bringing at elevated temperatures, boiling and/or producing steam.

The heater may be any heater, such as a heater of a steam generation device (e.g. as used for a pressurized steam generator (sometimes also indicated as system iron)) for providing steam, a water heater for providing hot drinking water like in a hot liquid vending machine (e.g. for making coffee, tea, cappuccino, or hot chocolate, etc.), an electric kettle, a coffee maker (drip filter), an espresso machine, a pad coffee machine, a boiler (for internal heating of a house (domestic boiler) or of an apartment, an office building), an industrial boiler etc.), a water heater arranged in a washing machine or in a dish washer, or a hot-water based weed killing device (or sprayer) (arranged to providing hot water to kill weed).

The invention also provides an arrangement with which the method of the invention may be applied. The invention therefore provides in an embodiment a (water) heater arrangement comprising a (water) heater arranged for heating an (aqueous) liquid, the (water) heater comprising a heating element to heat the (aqueous) liquid in the (water) heater, the heating element arranged to be in contact with the (aqueous) liquid, and an electrical power supply, arranged to apply the AC voltage between the heating element and a counter electrode. Hence, the heater arrangement may execute the herein described method.

Hence, the invention further provides a (water) heater arrangement comprising a heater, arranged for heating a liquid, comprising a heating element to heat the liquid in the heater and a counter electrode, a flow unit configured to flow the liquid between the heating element and the counter electrode, and an electrical power supply configured to apply an AC potential difference between the heating element and the counter electrode, wherein the AC potential difference varies with an AC frequency (f) in the range of 200-2500 Hz and has an amplitude in the range of 1-5 V.

In yet a further embodiment, the heater is configured to flow the liquid between the heating element and the counter electrode, and wherein the heater comprises a flow through heater, wherein the heating element encloses the counter electrode (see however also above). Flow through heaters are amongst others described in WO2006/067695 and WO2010/055472, which are incorporated herein by reference.

Hence, in a further aspect, the invention provides an electronic device comprising such heating arrangement wherein the electronic device is arranged to produce heated water and/or steam. Especially, the electronic device may in an embodiment be selected from the group consisting of an iron, a pressurized steam generator, a non-pressurized steam generator (sometimes also indicated as a garment steamer), a hot liquid vending machine, an electric kettle, a coffee maker (drip filter), an espresso machine, a pad coffee machine, a washing machine, a dish washer, and a hot-water based weed killing device (sprayer). The hot liquid vending machine may e.g. relate to a coffee maker, an espresso machine, a pad coffee machine, a hot chocolate machine, a hot chocolate pad machine, a soup machine, a hot tea machine, and vending machine that may have two or more of such functionalities. Hence, the invention especially further provides an electronic device for providing a beverage comprising a liquid at elevated temperature, the electronic device comprising a (water) heater arrangement as defined herein, wherein the electronic device is arranged to produce heated water and/or steam for the beverage. Such beverage may be coffee, thee, espresso, and hot chocolate. In an embodiment, the electronic device or vending machine may optionally also be able to produce one or more of an espresso macchiato, espresso con panna, caffé latte, flat white, caffé breve, cappuccino, caffé mocha, americano, latte macchiato, red eye, café du lait, ristretto, espresso dopio, café crème, pepresso, etc. etc.

In yet a further aspect, the invention also provides the use of an AC potential difference between a heating element and a counter electrode both in contact with a hot liquid, wherein the AC potential difference varies with an AC frequency (f) in the range of 200-2500 Hz and has an amplitude in the range of 1-5 V, to prevent or reduce scaling of the heating element. As mentioned above, the herein defined AC voltage is preferably applied during heating of the (aqueous) liquid in the heater with the heating element. This may have the most impact in preventing and/or reduction of scaling on the heating element.

In an embodiment, the method further includes a measurement of the conductivity of the (aqueous) liquid, and optionally of other parameters, and optionally controlling the AC voltage and optionally one or more other parameters in dependence of the measurement and a predefined relations between the conductivity (and the optional other parameters) and the AC voltage and optionally one or more other parameters. One or more optional other parameters that may be measured may be selected from the group consisting of the temperature of the (aqueous) liquid, the pH of the (aqueous) liquid, the current that is running (between the heating element and the counter electrode), the voltage drop when connecting the two electrodes (i.e. the heating element and the counter electrode), etc. Especially, the method may involve controlling one or more of the potential difference, and AC frequency (f), and optionally the duty cycle as function of one or more of (i) a current between the heating element and the counter electrode, and (ii) an electrical conductivity of the liquid. Especially, the current between the heating element and the counter electrode is measured. The current and/or the conductivity measurement(s) may give information about the chemical processes that occur.

Typically, the current density (i.e. between the heating element and the counter electrode) is in the range of 0.1-10 $mA/cm^2$, especially 0.1-5 $mA/cm^2$, such as especially 0.2-0.6 $mA/cm^2$, when using a flat heating element or a spiral shaped heating element in a boiler system, or especially 0.2-5 $mA/cm^2$ for a flow through heater.

The electrical power supply can be any system that is able to generate an AC voltage. Optionally, one or more of the frequency of the AC, the peak to peak voltage of the AC, etc., are variable and controllable, for instance one or more may be controlled in relation to a parameter like electric conductivity of the liquid and/or temperature of the liquid, or the current that is running. The term electrical power supply may in an embodiment also refer to a plurality of electrical power supplies. In principle, each voltage may be generated by a different electrical power supply.

The application of the voltage (i.e. potential difference) may be applied preferably permanently during the time the (aqueous) liquid is at elevated temperatures, but may in an embodiment also be applied periodically. Optionally, the voltage is applied before or after heating of the (aqueous) liquid. However, best results are obtained when the voltage is applied at least during heating of the (aqueous) liquid.

Especially, the water conductivity is in the range of 100-50,000 µS/cm and the water temperature is in the range of 50° C.—boiling temperature; especially ≥85° C.

The term "substantially" herein, such as in ""substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices or apparatus herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The term "and/or" especially indicates "one or more of". The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention further applies to an apparatus or device comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Furthermore, some of the features can form the basis for one or more divisional applications.

BRIEF DESCRIPTION OF THE DRAWINGS

Embodiments of the invention will now be described, by way of example only, with reference to the accompanying schematic drawings in which corresponding reference symbols indicate corresponding parts, and in which.

DETAILED DESCRIPTION OF THE EMBODIMENTS

Figure 1A:
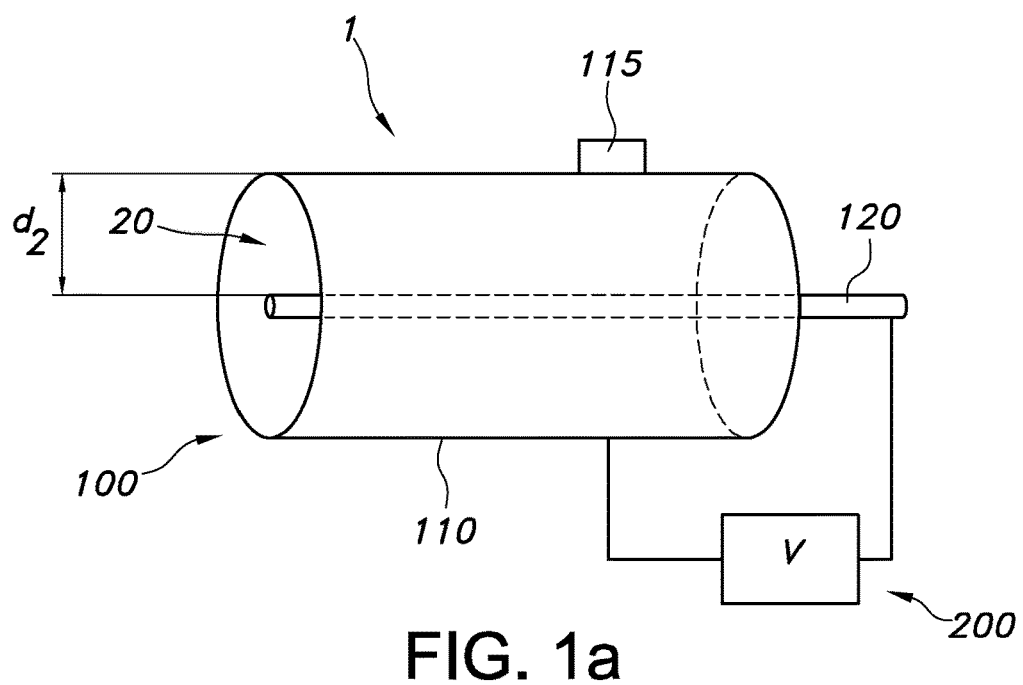
FIGS. 1a-1c schematically depict some possible configurations of a heater arrangement where the heating element is immersed in the water or where the heating element is a wall of a (water) heater, and indicate some aspects of the invention.

FIG. 1a schematically depicts a (water) heater arrangement ("heater arrangement") 1 comprising a (water) heater ("heater") 100, arranged for heating an (aqueous) liquid 20. The (aqueous) liquid 20, especially water, is contained in the heater 100. The heater 100 comprises a metal heating element 110 to heat the (aqueous) liquid 20 in the heater 100. The heater arrangement 1 further comprises an electrical power supply 200, arranged to apply an AC voltage between the heating element 110 and a counter electrode 120. By application of the voltage, the metal heating element 110 is protected against scaling and/or scaling formed may be removed. FIG. 1a schematically depicts an embodiment of a flow through heater (FTH), wherein the heater 100 is a heater through which the (aqueous) liquid 20 flows, while being heated. In the schematic embodiment of FIG. 1a, a heat generation device 115 is connected to the wall of the heater 100, and a rod within the heater is used as counter electrode 120. The wall is connected to a generation device 115 to heat the wall and is preferably of (stainless) steel; the wall is in contact with the (aqueous) liquid (not depicted) and is thus used as heating element 110. The counter electrode 120 may comprise a material as indicated in the description above for FIG. 1b. The heating element (110) and the counter electrode (120) have a (mutual) distance (d2), which may e.g. be in the range of 0.5-5 mm.

Optionally, the circumferential heating element and the counter electrode may be arranged the other way around, with the counter electrode enclosing the heating element (this embodiment is not depicted).

Figure 1B:
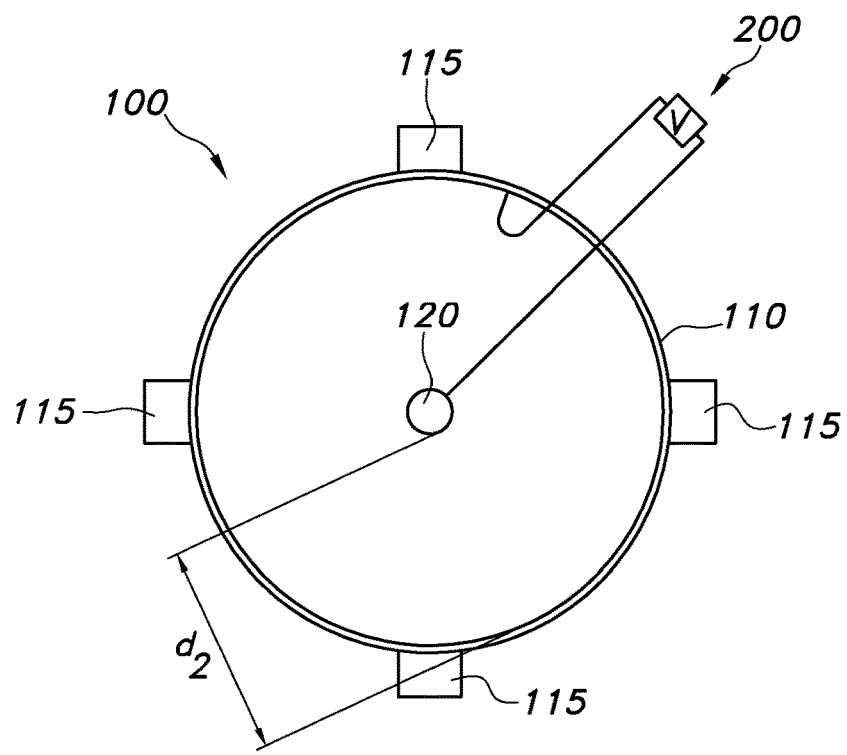

FIG. 1b schematically depicts substantially the same embodiment as schematically depicted in FIG. 1a, but now in cross-sectional view. Elements 115 heat wall of the heater 100. Therefore, the wall is indicated as heating element 110. Over this wall, i.e. heating element 110, and the counter electrode 120, a voltage is applied with electrical power supply 200. Here, the wall is used as heating element 110, and is preferably of (stainless) steel. The counter electrode 120 may comprise a material as indicated in the description above for FIG. 1b.

Figure 1C:
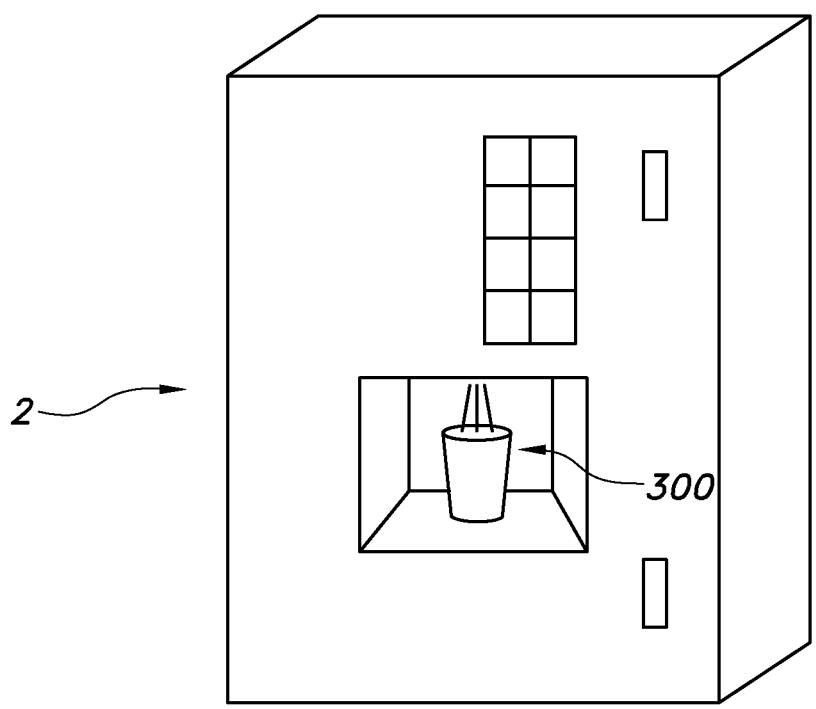

FIG. 1c schematically depicts an example of a vending machine as example of an electronic device 2. Reference 300 indicates a beverage.

Figure 2A:
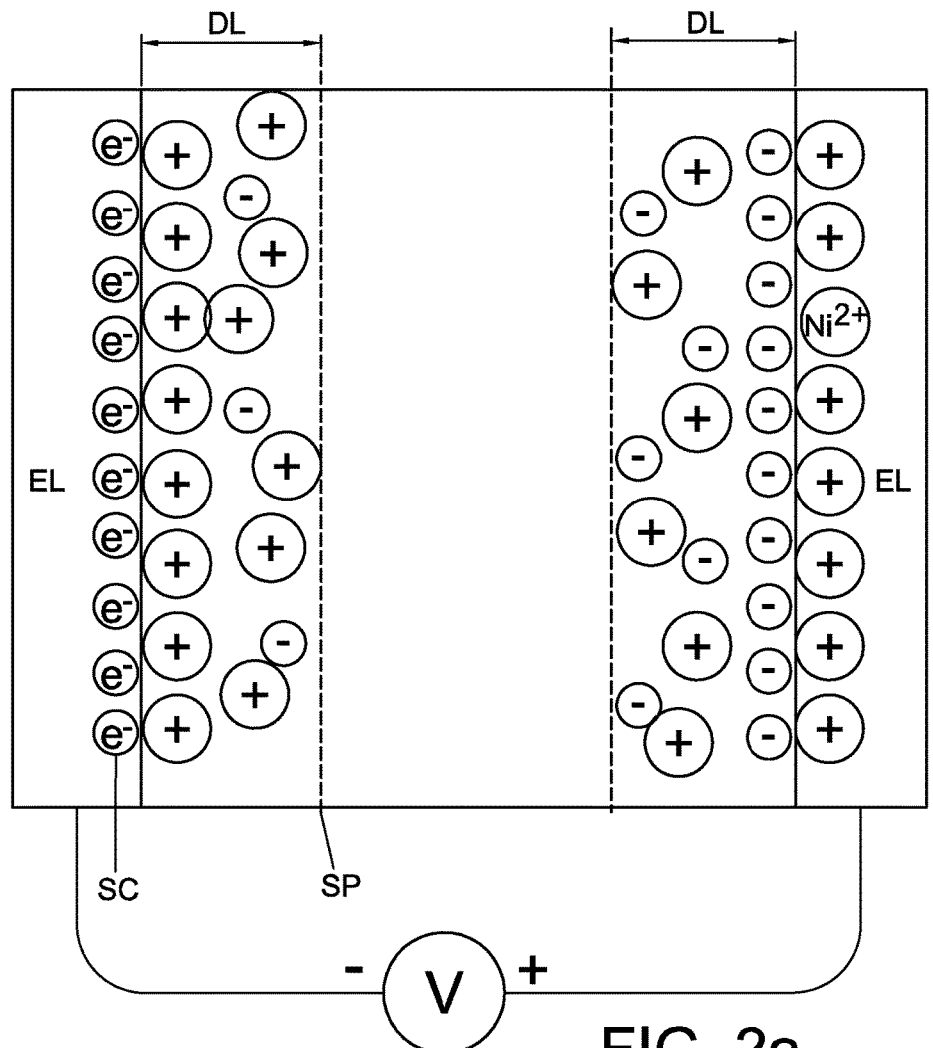
FIGS. 2a-2c schematically depict some examples of the electrochemistry and AC voltages.
Figure 2B:
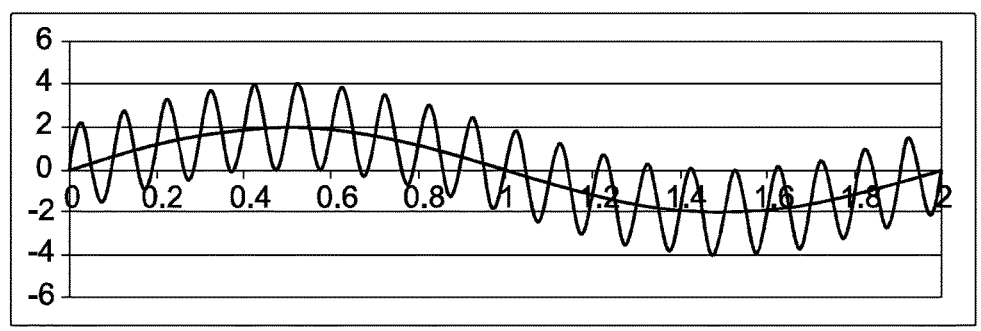

A basic idea behind the AC signal is that corrosion is suppressed by preventing metal ions to move from the electrode into solution. When the signal is positive, metal ions tend to leave the electrode into the water (corrosion). When the signal is sufficiently fast reversed the metal ions are pulled back to the electrode. When the reversal is fast enough ions cannot escape the boundary layer at the metal surface and corrosion is prevented. FIG. 2a schematically depicts two electrodes, like the heating element and the counter electrode. The electrodes are indicated with EL. When an AC voltage is applied, there will be surface charge SC formed, which changes in sign continuously because of the AC character. In the vicinity of the electrodes, there will be an electrical double layer, indicated with DL. The dashed line indicates the slipping plane SP that separates mobile fluid from fluid that remains attached to the surface. FIG. 2b shows a solution by way of reference, wherein a slow AC is modulated with a fast AC. Although the addition of a high frequency signal can suppress the corrosion of a single low frequency AC signal there is a drawback. The second AC signal needs to have certain amplitude to be effective. That means that when for example the amplitudes of both AC signals are equal that at the peak of the low frequency signal the amplitude is modulated by the second frequency bringing it down to 0V in the minimum but doubles it at the maximum (FIG. 2b). The doubling (in this example) of the amplitude can then result again in corrosion in spite of the second AC signal being present that could have prevented this corrosion due to the peak amplitude exceeding corrosion threshold.

Figure 2C:
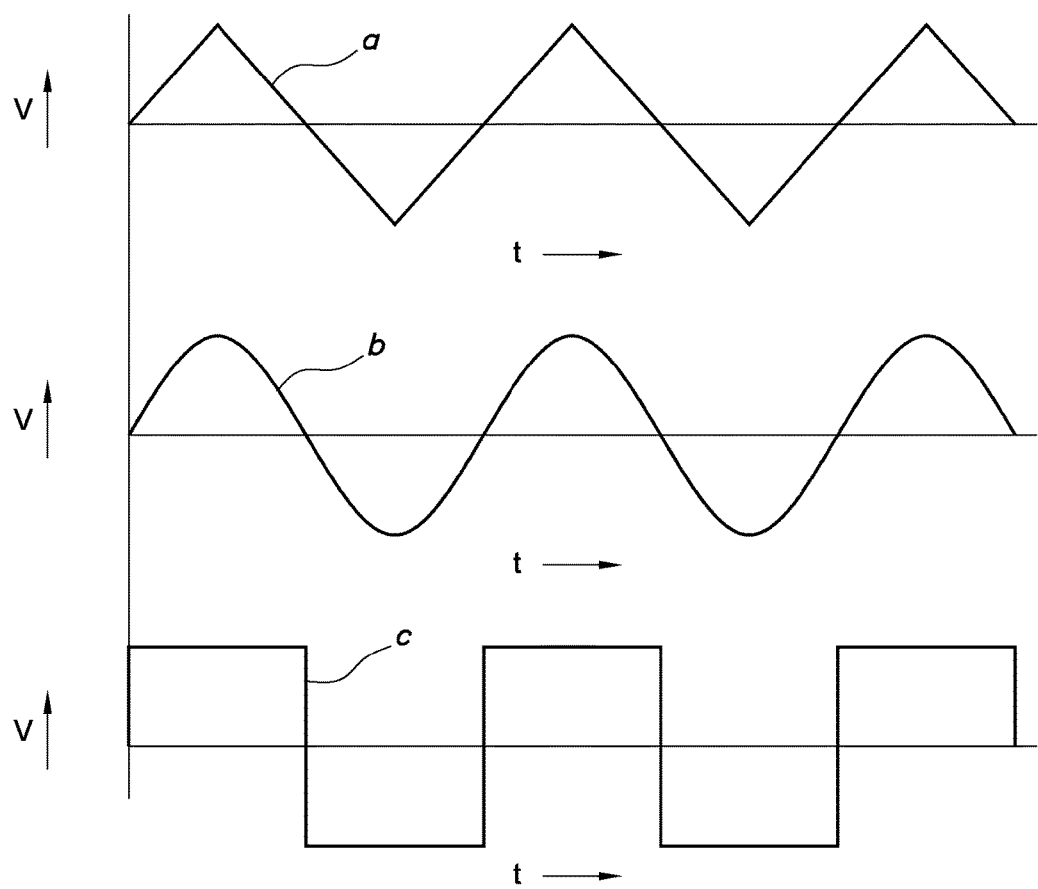

FIG. 2c schematically depicts different AC signals, with a) indicating a triangular wave signal, b) indicating a sinusoidal signal and c) indicating a block wave signal. The best results are obtained with the sinusoidal signal.

The heater arrangement 1 may further comprise a sensor (not depicted) to sense parameters like conductivity of the (aqueous) liquid, the temperature of the (aqueous) liquid, etc. Further, the heater arrangement 1 may further comprise a controller, to control the one or more features of the AC and the temporary sign change of the potential difference. The controller may control those one or more features in dependence of the one or more parameters and one or more predefined relations between the one or more parameters and the one or more features.

EXAMPLES

Water Preparation
Stock solutions of $CaCl_2.2H_2O$ (65.6 gr/ltr), $MgSO_4.7H_2O$ (38 gr/ltr) and $NaHCO_3$ (76.2 gr/ltr) were made. Standard hard water was made by mixing 50 gram of each stock solution into 9 liter of de-ionized water and adding up to 10 liter. The resulting water had a total hardness of 16.8 °DH and a temporary hardness of 11.2 °DH.

Total hardness is defined as 2.8×2×[mmol/ltr Ca+mmol Mg/ltr]. Temporary hardness is defined as 2.8×[mmol $HCO_{3-}$/ltr].

The first series of examples are comparative examples. These examples show that not each AC signal leads to the desired results and that tweaking of an AC potential difference also does not always lead to the desired results.

Corrosion Experiments (Low Temperature)
In the following examples the effect of various parameters is shown especially on the corrosion of the electrodes when the amplitude is increased. In a typical experiment two stainless steel electrodes (316 grade) of 2.5 and 6 mm diameter were immersed in a beaker filled with standard hard water. Water was heated to 75° C. and an electrical signal was applied across the electrodes. Current was run for 30 minutes and electrodes inspected visually.

Comparative Experiment 1

A sinusoidal AC signal of 3V and 0.5 Hz was applied across the two electrodes. Severe corrosion occurred at both electrodes.

Comparative Experiment 2

An AC signal of 3V and 0.5 Hz was modulated with a pulse that reverses the signal at 100 Hz at 80% duty cycle and applied on the two electrodes as in previous experiment. After 30 min the electrodes were visually inspected. The small (2.5 mm) electrode showed a weak yellow cast while the 6 mm electrode was colorless.

Comparative Experiment 3

An AC signal of 3V and 0.5 Hz was modulated with 100 Hz at 85% duty cycle and applied on the two electrodes as in previous experiment. After 30 min the electrodes were visually inspected. The small (2.5 mm) electrode showed a weak yellow cast while the 6 mm electrode showed a small discoloration. Coloration of the 85% duty cycle was comparable to the 80% duty cycle of experiment 2.

Comparative Experiment 4

An AC signal of 3V and 0.5 Hz was modulated with 100 Hz at 90% duty cycle and applied on the two electrodes as in previous experiment. After 30 min the electrodes were visually inspected. The small (2.5 mm) electrode had corroded and showed a deep yellow color. Also the larger 6 mm electrode was clearly yellow colored.

Experiments of above show clearly the effect of reversing the basis signal at a certain frequency in order to prevent corrosion and the effect of the duty cycle of the pulses.

Comparative Experiment 5

An AC signal of 3V and 0.5 Hz was modulated with 50 Hz instead of 100 Hz at 80% duty cycle and applied on the two electrodes as in previous experiment. After 30 min the electrodes were visually inspected. The small (2.5 mm) electrode was slightly yellow as was the 6 mm electrode. The discoloration was stronger than with the 100 Hz pulse.

Comparative Experiment 6

An AC signal of 3V and 0.5 Hz was modulated with 100 Hz at 80% duty cycle and applied on the two electrodes. The signal was not 100% reversed but only to 0V. After 30 min the electrodes were visually inspected. The small (2.5 mm) electrode had severely corroded while the 6 mm electrode was yellow in color.

Comparative Experiment 7

An AC signal of 3V and 0.1 Hz was modulated with 100 Hz at 80% duty cycle when in positive amplitude and with 100 Hz 20% when in negative amplitude. (The 2.5 mm electrode was connected to the positive terminal). The 2.5 mm electrode showed yellowing while the 6 mm electrode was clean. On top of that the 6 mm showed scale formation. The latter indicates that clearly water was decomposed as due to the duty cycles the 6 mm electrode was facing continuously a high pH giving rise to scale formation.

Test Setup for a Flow through Heater
The heater is schematically shown in the FIGS. 1a and 1b. The outer tube, first heating element 110, is a stainless steel tube with two heat generation devices 115 at both sides. The outer tube has a 15 cm length and a 13 mm inner diameter Together, they in fact form one heating element, surrounded by aluminum, with which the liquid is in contact when the liquid flows through the tube. The inner tube may also be of stainless steel, and had a larger diameter than schematically depicted in FIGS. 1a and 1b: as counter electrode 120 a stainless steel tube of 8 mm diameter was inserted in the tube. Water was passed through the area between the two stainless steel tubes at a speed of 2.25 ml/sec; the pressure in the heater system was 6-10 bar. Both the outer tube and the inner tube of the water heating system were connected electrically. A typical test cycle consisted of heating water for 70 seconds and cooling down for 50 seconds. This cycle was repeated for 500 times.

Comparative Experiment 8

Said (water) heater was used for testing the calcification by the two water types without any electrical signal applied across the two electrodes. In both cases especially the wall was fully calcified and a dense layer of scale was formed that was strongly adhering to the wall.

Corrosion Experiments
In the following examples the effect of various parameters is shown especially on the corrosion of the electrodes when the frequency and amplitude is changed. The experiments were conducted with a flow through heater. The heater consists of a stainless steel tube (316 grade), with an inner diameter of 13 mm, functioning as electrode. Two heating elements are connected to the outside of the tube. Inside the steel tube a second tube is mounted (304 grade). The second tube has an outer diameter of 8 mm and functions as the 2nd electrode. Water flows in between the two tubes. A typical experiment consists of 500 cycles, where each cycle comprises heating 150 ml of standard hard water to 100 degrees Celcius and an electrical signal applied across the electrodes. The water is heated and dispensed with 2.25 ml/s at high pressure, between 6 and 10 bars, resembling espresso conditions. One experiment corresponds to 1500 cups of espresso.

Experiment 1

A sinusoidal AC signal with amplitude 2.8V and frequency 200 Hz was applied across the two electrodes. Pitting corrosion at the outer tube and coloration of both electrodes occurred.

Experiment 2

A sinusoidal AC signal with amplitude 2.8V and frequency 1000 Hz was applied across the two electrodes. No corrosion occurred. Calc build-up almost absent.

Experiment 3

A sinusoidal AC signal with amplitude 2.8V and frequency 2000 Hz was applied across the two electrodes. No corrosion occurred and no decalcification effect was observed.

If the frequency is too low, the metal ions will still escape from the electrode into the water and corrosion occurs. If the frequency is too high there is not enough time for acid to form and act on the calc. It is important to note that the sole application of an AC signal to prevent calcification will only work if the mobility of the ions is high; in the experiments the flow through heater wall temperature is between 140 and 180 degrees Celcius.

Experiment 4

A sinusoidal AC signal with amplitude 1.6V and frequency 1000 Hz was applied across the two electrodes. No corrosion occurred and decalcification effect is limited.

Experiment 5

A sinusoidal AC signal with amplitude 3.2V and frequency 1000 Hz was applied across the two electrodes. Pitting corrosion occurred. Comparing experiments 4 and 5 with experiment 1, the importance of the amplitude is demonstrated. A low amplitude prevents corrosion, but not enough acid is formed to effectively prevent calcification. A too high amplitude will induce corrosion.
Additional experiments were performed with a block signal:

Experiment 6

A block shaped AC signal with amplitude 1.6V and frequency 1000 Hz was applied across the two electrodes. No corrosion; limited decalcification effect.

Experiment 7

A block shaped AC signal with amplitude 2.0V and frequency 1000 Hz was applied across the two electrodes. Both electrodes show coloration.

Experiment 8

A block shaped AC signal with amplitude 2.8V and frequency 1000 Hz was applied across the two electrodes. The results are less advantageous.

The invention claimed is:
1. A heater arrangement comprising:
   a heater configured to heat a liquid and having a heating element configured to heat the liquid in the heater and a counter electrode;
   a flow unit configured to flow the liquid between the heating element and the counter electrode; and
   an electrical power supply configured to apply an AC potential difference between the heating element acting as an electrode and the counter electrode,
   wherein the heating element and the counter electrode have a mutual distance in a range of 0.5-5 mm.
2. The heater arrangement according to claim 1, wherein the heater comprises a flow through heater, and wherein the heating element encloses the counter electrode.
3. The heater arrangement according to claim 1, wherein the AC potential difference varies with an AC frequency in a range of 200-2500 Hz and has an amplitude in a range of 1-5 V.
4. The heater arrangement of claim 1, wherein the AC potential difference varies with an AC frequency in a range of 500-1500 Hz, and wherein the AC potential difference is in a range of 1.5-4 V.
5. The heater arrangement of claim 1, wherein the heater is configured to heat the heating element to a temperature in the range of 140-180° C., and wherein the liquid in contact with the heating element is at a pressure in a range of 7-12 bar.
6. The heater arrangement of claim 1, wherein the flow unit is configured to flow the liquid between the heating element and the counter electrode with a volume flow rate in a range of 1.5-10 ml/s.
7. An electronic device for providing a beverage comprising a liquid at elevated temperature, the electronic device comprising a heater arrangement, wherein the electronic device is arranged to produce heated water and/or steam for the beverage, and wherein the heater arrangement comprises:
   a heater configured to heat a liquid and having a heating element to heat the liquid in the heater and a counter electrode;
   a flow unit configured to flow the liquid between the heating element and the counter electrode; and
   an electrical power supply configured to apply an AC potential difference between the heating element acting as an electrode and the counter electrode,
   wherein the AC potential difference varies with an AC frequency in a range of 200-2500 Hz and has an amplitude in a range of 1-5 V, and
   wherein the heating element and the counter electrode have a mutual distance in a range of 0.5-5 mm.
8. The electronic device according to claim 7, wherein the electronic device is a vending machine.

9. A heater arrangement comprising:
a heater configured to heat a liquid and having a heating element configured to heat the liquid in the heater and a counter electrode;
a flow unit configured to flow the liquid between the heating element and the counter electrode; and
an electrical power supply configured to apply an AC potential difference between the heating element acting as an electrode and the counter electrode; and
a controller;
wherein the AC potential difference varies with an AC frequency, and
wherein the controller is configured to control at least one of the AC potential difference and the AC frequency as function of at least one of (i) a current between the heating element and the counter electrode, and (ii) an electrical conductivity of the liquid.

10. A heater arrangement comprising:
a heater configured to heat a liquid and having a heating element configured to heat the liquid in the heater and a counter electrode;
a flow unit configured to flow the liquid between the heating element and the counter electrode; and
an electrical power supply configured to apply an AC potential difference between the heating element acting as an electrode and the counter electrode,
wherein the electrical power supply is configured to apply the AC potential difference by providing a first AC signal modulated with a second AC signal such that a combination of the first and second AC signals has a peak amplitude below a corrosion threshold of at least one of the electrode and the counter electrode.

11. A heater arrangement comprising:
a heater configured to heat a liquid and having a heating element configured to heat the liquid in the heater and a counter electrode;
a flow unit configured to flow the liquid between the heating element and the counter electrode; and
an electrical power supply configured to apply an AC potential difference between the heating element acting as an electrode and the counter electrode, the AC potential difference being a pulse having a duty cycle between 80% to 90%.

* * * * *